Oct. 27, 1953

R. A. JOELSON 2,657,081

MULTIPLE BORE PULLEY ASSEMBLY

Filed Jan. 23, 1951

INVENTOR.
RONALD A. JOELSON
BY
McMorrow, Berman & Davidson
ATTORNEYS.

Oct. 27, 1953 — R. A. JOELSON — 2,657,081
MULTIPLE BORE PULLEY ASSEMBLY
Filed Jan. 23, 1951 — 2 Sheets-Sheet 2

INVENTOR.
RONALD A. JOELSON
BY
McMorrow, Berman & Davidson
ATTORNEYS.

Patented Oct. 27, 1953

2,657,081

UNITED STATES PATENT OFFICE 2,657,081

MULTIPLE BORE PULLEY ASSEMBLY

Ronald A. Joelson, Chetek, Wis.

Application January 23, 1951, Serial No. 207,366

7 Claims. (Cl. 287—52)

This invention relates to drive devices, such as belt pulleys and gears, and more particularly to a belt pulley having a hub providing selectively usable shaft bores of different sizes.

It is among the objects of the invention to provide a drive device, such as a belt pulley, having a hub provided with selectively usable bores of different sizes so that the pulley can be adapted to different size drive shafts; which is effective to accurately center the selected bore at the center of the pulley and maintain the selected bore in centered position; which is accurately balanced regardless of the bore selected for use; which is easy to adjust to bring any selected bore to centered position; and which is simple and durable in construction, economical to manufacture, and may be provided in pulleys or other drive devices of various forms and sizes.

Other objects and advantages will become apparent from a consideration of the following description and the appended claims in conjunction with the accompanying drawings, wherein:

Figure 1:
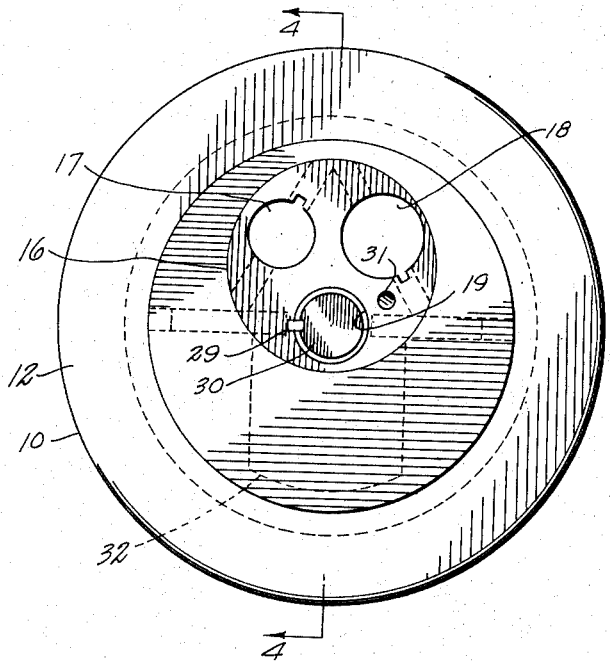
Figure 1 is an end elevational view of a drive device illustrative of the invention.
Figure 2:
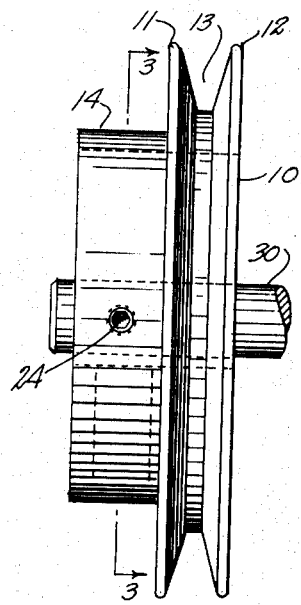
Figure 2 is a side elevational view of the drive device illustrated in Figure 1.
Figure 3:
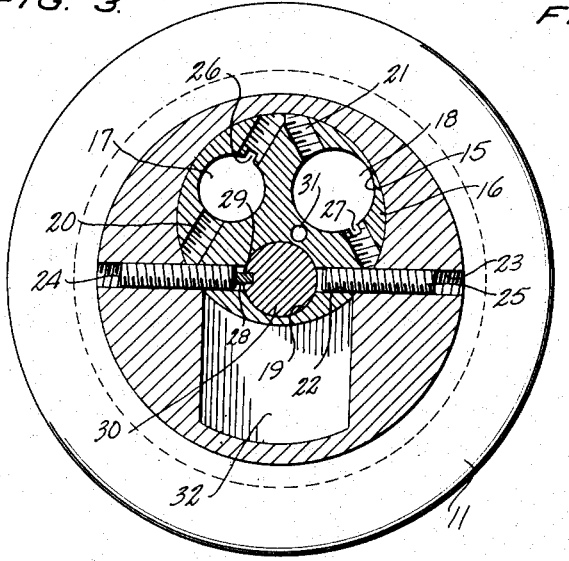
Figure 3 is a cross-sectional view on the line 3—3 of Figure 2.
Figure 4:
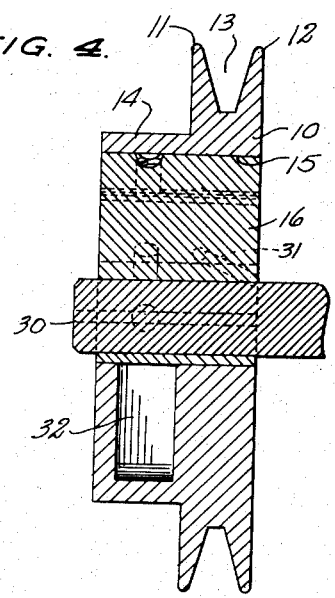
Figure 4 is a cross-sectional view on the line 4—4 of Figure 1.
Figure 5:
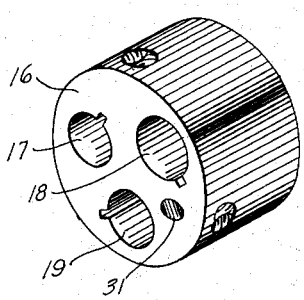
Figure 5 is a perspective view of a cylindrical hub constituting an operative component of the drive device illustrated in Figures 1 to 4 inclusive.

With continued reference to the drawings and particularly to Figures 1 to 5 inclusive, the first form of the invention comprises a circular belt pulley 10 having spaced apart peripheral flanges 11 and 12 providing therebetween a belt groove 13 of generally V-shaped cross section. This pulley has on one side thereof a cylindrical extension 14 coaxial with the pulley and a circular opening 15 extends through the pulley and the extension 14 with its axis spaced from and substantially parallel to the axis of the pulley. The diameter of the opening 15 extends from one side of the pulley past the pulley axis and a cylindrical hub 16 is mounted in the opening 15 for rotation about its own axis. This hub 16 has a length substantially equal to the combined thickness of the pulley 10 and extension 14 and has its ends flush with the opposite faces of the pulley and the cylindrical extension.

The hub 16 is provided with three bores 17, 18 and 19 extending therethrough and having their axes spaced apart at substantially equal angular intervals and spaced outwardly from and parallel to the axis of the hub. The axes of the bores 17, 18 and 19 lie in a circle which passes through the axis of the pulley so that any one of the bores can be centered in the pulley so that its axis is coincident with the pulley axis. These bores 17, 18 and 19 are of relatively different sizes and may be dimensioned to receive the standard motor shaft of one-half, five-eighths and three-fourths inch diameter.

The hub 16 is provided with tapped holes 20, 21 and 22 extending chordwise therethrough intermediate the length thereof with their center lines intersecting the axes of the bores 17, 18 and 19 respectively. The pulley extension 14 is provided with a tapped hole 23 extending diametrically therethrough with its center line intersecting the axis of the pulley.

These tapped holes are all preferably oppositely threaded in their respectively opposite ends and set screws 24 and 25 preferably of the "Allen head" type are threaded one into each end of the hole 23.

When the set screws 24 and 25 are backed out away from the hub 16, the hub can be turned in the opening 15 to bring any selected one of the bores 17, 18 or 19 into centered position with its axis coincident with the pulley axis whereupon the set screws may be threaded into the corresponding tapped hole 20, 21 or 22 in the hub to firmly lock the hub in position in the pulley with the selected bore properly centered in the pulley.

Each of the bores is provided at one side with a keyway, as indicated at 26, 27 and 28 for the bores 17, 18 and 19 respectively and a key 29 received in the keyway of the selected bore engages in a key slot provided in the motor shaft 30 to provide a driving connection between the motor shaft and the pulley.

Preferably the key slots in the bores are centered on the center lines of the corresponding tapped holes in the hub so that, when the pulley is assembled on the motor shaft, the inner end of one of the set screws will be brought to bear against the outer side of the key 29 to assist in securing the pulley on the shaft and the key in operative position in the coresponding keyway and the key slot of the shaft.

An aperture 31 is drilled through the hub 16 extending in an inclined direction from one face or end of the hub substantially to the periphery of the hub intermediate the length thereof for receiving a pin by means of which the hub is turned in the hub receiving opening in the pulley when it is desired to change the selection of bores for receiving the drive shaft.

At the side of the pulley axis opposite the major portion of the opening 15, the extension 14 is hollowed out, as indicated at 32, to provide a pocket, the volume of which is substantialy equal to the volume of two of the bores in the hub 16 so that the weight of the pulley will be accurately balanced around the axis of pulley rotation.

Figure 6:
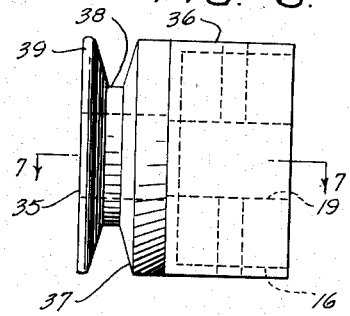
Figure 6 is a side elevational view of a somewhat modified form of drive device.
Figure 8:
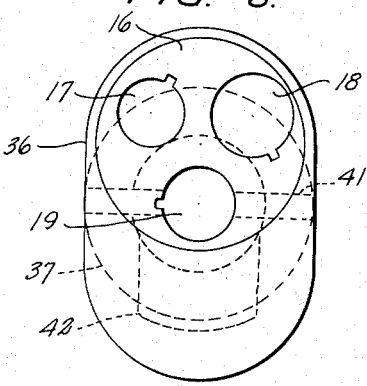
Figure 8 is a front elevational view of the drive device illustrated in Figures 6 and 7.
Figure 7:
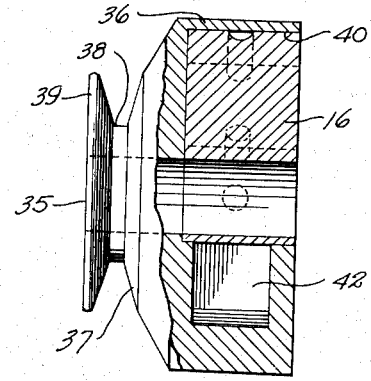
Figure 7 is a cross-sectional view on the line 7—7 of Figure 6.

In the first form of the invention shown in Figures 1 to 5 inclusive, the pulley is materially larger than the hub 16 so that the hub receiving opening can be provided eccentrically in the pulley itself. As the diameter of the hub cannot be reduced below a predetermined minimum if the hub is to contain the desired number of bores of predetermined sizes, when it is desired to use this hub with a pulley having a diameter insufficient to receive the hub receiving opening in proper eccentric position therein, it becomes necessary to utilize a somewhat different construction, such as that illustrated in Figures 6, 7 and 8.

In this second form of the invention, the pulley 35 is provided at one side of an extension 36 of somewhat elliptical shape, the major diameter of which is materially greater than the diameter of the pulley and the minor diameter of which is substantially the same as the diameter of the pulley.

The pulley 35 is formed at one side of the extension 36 and one working surface of the pulley is provided by a beveled face 37 on the adjacent end of the extension. A cylindrical pulley bottom portion 38 extends from the beveled face 37 coaxially thereof and an outer flange 39 is carried by the cylindrical portion 38 at the end thereof remote from the face 37.

A cylindrical hub receiving opening 40 is provided in one end of the extension 36 and the diameter of this opening extends from this end of the extension past the pulley axis. The hub 16, described above, having the bores 17, 18 and 19 therein is rotatably mounted in the opening 40 and the extension 36 is provided with a tapped hole 41 extending diametrically therethrough, substantially at its mid-length location so that its center line intersects the pulley axis. The set screws 24 and 25 are threaded into the respectively opposite ends of the tapped hole 41 to lock the hub 16 in selected rotational positions in the extension 36 in the manner described above in connection with the first form of the invention.

The extension 36 is internally hollowed out in its end opposite the end receiving the opening 40 to provide a pocket 42 of substantially the same volume as the volume of two of the bores in the hub 16 so that the weight of the extension 36 will be balanced around the axis of rotation of the pulley and the extension.

Figure 9:
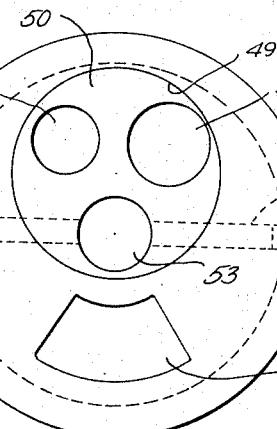
Figure 9 is a front elevational view of a still further modified form of drive device.
Figure 10:
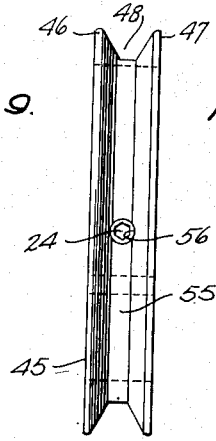
Figure 10 is a side or edge elevational view of the drive device illustrated in Figure 9.
Figure 11:
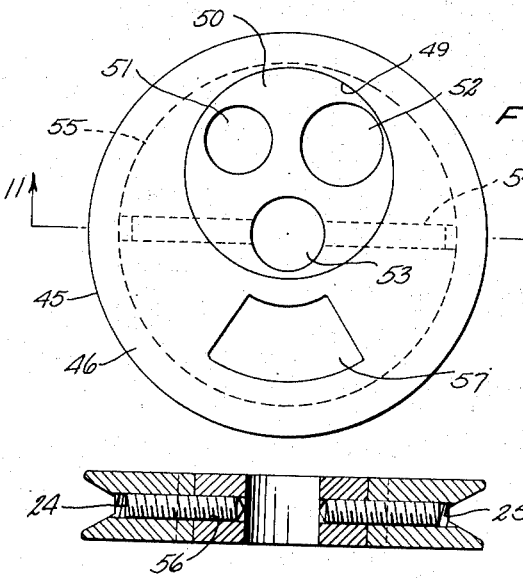
Figure 11 is a cross-sectional view on the line 11—11 of Figure 9.

The third form of pulley, particularly illustrated in Figures 9, 10 and 11, is adapted for light loads and comprises a belt pulley 45 having flat and substantially parallel end faces with no lateral extension thereon. This pulley has a circular periphery provided with spaced apart peripheral flanges 46 and 47 to provide therebetween a belt grooves 48 of generally V-shaped cross section and has a circular or cylindrical opening 49, a diameter of which extends from one side of the pulley past the pulley axis. A cylindrical hub 50 corresponding in all respects to the hub 16 except that it has a length substantially the same as the thickness of the pulley 45 is mounted in the opening 49 with its ends substantially flush with the corresponding end faces of the pulley. This hub 50 is provided with three bores 51, 52 and 53 which may be of the same relative sizes as the bores 17, 18 and 19 in the hub 16 and are arranged in the same manner in the hub. These bores 51, 52 and 53 may be provided with keyways or the keyways may be omitted if the pulley is designed for use as an idler pulley to rotate on a fixed shaft or axis.

The pulley 45 has a tapped hole 54 extending diametrically therethrough with its ends in the peripheral portion 55 of the pulley between the flanges 46 and 47 and its center line intersecting the axis of pulley rotation. This hole 54 receives the set screws 24 and 25 which are threaded at their inner ends into tapped holes, as indicated at 56 in Figure 11, extending chordwise of the hub 50 with their center lines respectively intersecting the axes of the bores 51, 52 and 53. These set screws lock the hub 50 in selected rotational positions in the pulley 55 in the manner explained above in connection with the first and second forms of the invention.

Opposite the opening 49 the pulley is provided with a lightening hole or recess 57 so that the weight of the pulley and hub will be equally distributed around the axis of pulley rotation and the pulley will be in balance.

While the invention has been illustrated in combination with a V-belt pulley, it is to be understood that it may be combined with other forms of belt pulleys or with gears and other circular rotatable devices, such as abrasive wheels and sanding disks. Also, while the hub has been illustrated as having three bores of specified sizes, it is to be understood that the number of bores and the sizes of the bores may be varied without in any way exceeding the scope of the invention.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

Having thus described the invention, what is claimed is:

1. A rotatable device comprising a body having an axis of rotation and having a circular opening therein with the axis of said opening spaced from and parallel to the axis of rotation of said body, a cylindrical hub rotatably mounted in said opening and having angularly spaced apart bores of different sizes extending therethrough, the axes of said bores being spaced from and parallel to the axis of said hub and spaced apart along a circle which passes through the axis of rotation of said body, and means connected between said body and said hub holding said hub in positions of rotation relative to said body with the axis of any selected bore coincident with the axis of rotation of said body.

2. A rotatable device comprising a body having an axis of rotation and having a circular opening therein with the axis of said opening spaced from and parallel to the axis of rotation of said body, a cylindrical hub rotatably mounted in said opening and having angularly spaced apart bores of different sizes extending therethrough, the axes of said bores being spaced from and parallel to the axis of said hub and lying in a circle which passes through the axis of rotation of said body, and means connected between said body and said hub holding said hub in positions of rotation relative to said body with the axis of any selected bore coincident with the axis of rotation of said body, said body having a lightening recess therein at the side of said axis of rotation remote from the major portion of said opening.

3. A rotatable device comprising a body having an axis of rotation and having a circular opening therein with the axis of said opening spaced from and parallel to the axis of rotation of said body, a cylindrical hub rotatably mounted in said opening with its axis spaced from and parallel to said axis of rotation and having angularly spaced apart bores of different sizes extending therethrough, the axes of said bores being spaced from and parallel to the axis of said hub and lying in a circle which is centered on the axis of said hub and passes the axis of rotation of said body, said hub having tapped holes extending chordwise therethrough intermediate its ends with their longitudinal center lines respectively intersecting the axes of said bores, said body having a tapped hole extending therethrough with its center line perpendicularly intersecting said axis of rotation, and set screws threaded into the tapped holes in said body and threadable into the tapped holes in said hub to hold said hub in positions relative to said body with the axis of any selected bore coincident with the axis of rotation of said body.

4. A multiple bore pulley assembly comprising a circular pulley having an axis of rotation and at least one end face substantially perpendicular to said axis of rotation, a cylindrical hub carried by said pulley and having an axis of rotation relative to said pulley spaced from and parallel to the axis of rotation of said pulley, said hub having angularly spaced apart bores of different sizes extending therethrough with their axes spaced from and parallel to the axis of rotation of said hub and lying in a cylindrical surface coaxial with the axis of rotation of said hub and including the axis of rotation of said pulley whereby the axis of any selected bore can be brought into coincidence with the axis of rotation of said pulley by rotating said hub relative to said pulley, and means acting between said pulley and said hub to releasably secure said hub in selected rotational positions relative to said pulley.

5. A multiple bore pulley assembly comprising a circular pulley having an axis of rotation and having a coaxial extension on one side thereof, said pulley and said extension having a circular opening extending therethrough with its axis spaced from and parallel to the axis of rotation of said pulley, a cylindrical hub disposed in said opening and having an axis of rotation of said hub relative to said pulley spaced from and parallel to the axis of rotation of said pulley, said hub having angularly spaced apart bores of different sizes extending therethrough with their axes spaced from and parallel to the axis of rotation of said hub and lying substantially in a cylindrical surface coaxial with the axis of rotation of said hub and including the axis of rotation of said pulley whereby the axis of any selected bore can be brought into coincidence with the axis of rotation of said pulley by rotating said hub relative to said pulley, and means acting between said pulley and said hub to releasably secure said hub in selected rotational positions relative to said pulley, said extension having a lightening recess therein at the side of the axis of rotation of said pulley remote from the axis of rotation of said hub.

6. A multiple bore pulley assembly comprising a circular pulley having an axis of rotation and having an extension of generally elliptical shape on one side thereof substantially coaxial with said axis of rotation, said extension having a circular opening therein adjacent one end thereof, a cylindrical hub disposed in said opening and having an axis of rotation of said hub relative to said pulley spaced from and parallel to the axis of rotation of said pulley, said hub having angularly spaced apart bores of different sizes extending therethrough with their axes spaced from and parallel to the axis of rotation of said hub and lying substantially in a cylindrical surface coaxial with the axis of rotation of said hub and including the axis of rotation of said pulley whereby the axis of any selected bore can be brought into coincidence with the axis of rotation of said pulley by rotating said hub relative to said pulley, and means acting between said pulley and said hub releasably securing said hub in selected rotational positions relative to said pulley, said extension having in the other end thereof a lightening recess for balancing the weight of said pulley, said extension and said hub about the axis of rotation of said pulley.

7. A multiple bore pulley assembly comprising a circular pulley having an axis of rotation and parallel end faces disposed substantially perpendicular to said axis of rotation, said pulley having a circular opening therein, the axis of which is spaced from and substantially parallel to the axis of rotation of said pulley, a cylindrical hub disposed in said opening and having end faces substantially flush with the end faces of said pulley, said hub having an axis of rotation of the hub relative to the pulley spaced from and parallel to the axis of rotation of said pulley and having angularly spaced apart bores of different sizes extending therethrough with their axes spaced from and parallel to the axis of rotation of said hub and lying substantially in a cylindrical surface coaxial with the axis of rotation of said hub and including the axis of rotation of said pulley whereby the axis of any selected bore can be brought into coincidence with the axis of rotation of said pulley by rotating said hub in said opening relative to said pulley, and means releasably connecting said hub to said pulley to hold said hub in selected rotational positions relative to said pulley.

RONALD A. JOELSON.

References Cited in the file of this patent

UNITED STATES PATENTS

| Number | Name | Date |
|---|---|---|
| 2,507,093 | Collings | May 9, 1950 |

FOREIGN PATENTS

| Number | Country | Date |
|---|---|---|
| 124,918 | Great Britain | Apr. 10, 1919 |
| 194,486 | Germany | Jan. 20, 1908 |